United States Patent
Madsen et al.

(10) Patent No.: US 9,732,776 B2
(45) Date of Patent: Aug. 15, 2017

(54) MARMAN CLAMP WITH A SHAPE MEMORY ALLOY ACTUATOR

(71) Applicant: The Boeing Company, Chicago, IL (US)

(72) Inventors: Casey Lyn Madsen, Normandy Park, WA (US); Thomas R. Smith, Westminster, CA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 14/511,350

(22) Filed: Oct. 10, 2014

(65) Prior Publication Data

US 2016/0102689 A1   Apr. 14, 2016

(51) Int. Cl.
   *F16B 2/06* (2006.01)
   *B64G 1/64* (2006.01)

(52) U.S. Cl.
   CPC ............... *F16B 2/06* (2013.01); *B64G 1/641* (2013.01)

(58) Field of Classification Search
   CPC .................................. F16B 2/06; B64G 1/22
   See application file for complete search history.

(56) References Cited

U.S. PATENT DOCUMENTS

| | | | | | |
|---|---|---|---|---|---|
| 4,899,543 A * | 2/1990 | Romanelli | ............... | F03G 7/065 | 294/103.1 |
| 5,482,029 A * | 1/1996 | Sekiguchi | .......... | A61B 1/00039 | 600/109 |
| 6,056,775 A * | 5/2000 | Borghi | .................... | A61F 2/856 | 606/195 |
| 6,323,459 B1 * | 11/2001 | Maynard | .............. | A61B 1/0058 | 219/209 |
| 6,672,338 B1 * | 1/2004 | Esashi | ............... | A61M 25/0158 | 138/119 |
| 6,872,433 B2 * | 3/2005 | Seward | .................. | A61L 29/126 | 428/35.7 |
| 7,891,075 B2 * | 2/2011 | Mankame | .............. | B23Q 3/086 | 148/402 |
| 7,928,826 B1 * | 4/2011 | Woychik | ................ | H01H 37/68 | 337/122 |
| 7,939,178 B2 * | 5/2011 | Sar | ........................... | B64C 3/40 | 148/402 |

(Continued)

OTHER PUBLICATIONS

Dowen et al., "Development of a Reusable, Low-Shock Clamp Band Separation System for Small Spacecraft Release Applications," Paper No. SSC01-X1-7, 15th Annual/USU Conference on Small Satellites, Logan, Utah, Aug. 2001.

(Continued)

*Primary Examiner* — Justin Benedik
(74) *Attorney, Agent, or Firm* — McDonnell Boehnen Hulbert & Berghoff LLP

(57) ABSTRACT

A Marman clamp is disclosed. The Marman clamp includes a release mechanism with either pins or tubes formed with a shape memory alloy. The release mechanism opens and closes the clamp depending on the temperature of the pins or tubes. The temperature of the pins or tubes may be based on whether a space vehicle including the clamp is in a direct line of sight of radiation from the sun. Alternatively, a heat source may control the temperature of the pins or tubes. The Marman clamp may also open and close as a result of an independent force applied to the release mechanism.

11 Claims, 3 Drawing Sheets

(56) References Cited

U.S. PATENT DOCUMENTS

| | | | |
|---|---|---|---|
| 7,984,746 B2* | 7/2011 | Gao | B60J 1/2011 |
| | | | 160/370.21 |
| 8,118,264 B2 | 2/2012 | Mabe et al. | |
| 8,226,127 B2* | 7/2012 | Rippstein | F16L 33/03 |
| | | | 285/23 |
| 8,408,136 B1 | 4/2013 | Lee | |
| 8,584,987 B2 | 11/2013 | Madsen et al. | |
| 9,089,313 B2* | 7/2015 | Roue | A61B 17/00234 |
| 2002/0142119 A1* | 10/2002 | Seward | A61L 29/126 |
| | | | 428/36.9 |
| 2002/0192617 A1* | 12/2002 | Phan | A61C 7/00 |
| | | | 433/6 |
| 2002/0195177 A1* | 12/2002 | Hinkley | C22F 1/006 |
| | | | 148/559 |
| 2005/0198777 A1 | 9/2005 | Mabe | |
| 2006/0156785 A1* | 7/2006 | Mankame | B23Q 3/086 |
| | | | 72/413 |
| 2009/0283936 A1* | 11/2009 | Sanderson | B29C 44/56 |
| | | | 264/413 |
| 2009/0286101 A1* | 11/2009 | Sar | B64C 3/40 |
| | | | 428/613 |
| 2011/0212342 A1* | 9/2011 | Sar | B29C 61/00 |
| | | | 428/592 |

OTHER PUBLICATIONS

Lazansky, "Refinement of a Low-Shock Separation System," Proceedings of the 41st Aerospace Mechanisms symposium, Jet Propulsion Laboratory, May 16-18, 2012, pp. 329-343.
NASA Preferred Reliability Practices, Guideline No. GD-ED-2214, "Marman Clamp System Design Guidelines," pp. 1-8.

\* cited by examiner

MARMAN CLAMP WITH A SHAPE MEMORY ALLOY ACTUATOR

FIELD

The disclosure is related to Marman clamps and, more particularly, to a Marman clamp having a shape memory alloy actuator.

BACKGROUND

Marman clamps are commonly used in space vehicles to connect satellite payloads to rockets, join rocket stages and antennas, and as a general clamping mechanism. A Marman clamp is a band clamp that allows two cylindrical interfaces to be clamped together. A typical Marman clamp system 100 is shown in FIGS. 1*a-c* and is also found in NASA's Marman Clamp System Design Guidelines, Guideline No. GD-ED-2214.

As shown in FIGS. 1*a-c*, the Marman clamp system 100 includes a tension strap 102 that creates radial forces on V-segments 104, which wedge together flanges of cylindrical structures in an axial direction. A release mechanism 106 includes two end fittings 110, each with a nut 112 connected to a bolt 108. The Marman clamp system 100 remains in a closed position until the release mechanism 106 is opened via a force, for example, by a pyrotechnic bolt cutter. Based on this type of release mechanism 106, these Marman clamps are sometimes referred to as pyrotechnic-based clamps.

With the Marman clamp system 100, multiple release mechanisms are required in space applications in case one of the mechanisms fails to open. For example, up to four release mechanisms may be required depending on the size of the clamp. These additional release mechanisms add to the weight and complexity to the space vehicle that includes the Marman clamp system 100.

Thus, it would be beneficial to have a Marman clamp that does not require redundant release mechanisms in space applications, eliminating both the added weight and complexity.

SUMMARY

A Marman clamp that includes a release mechanism that places a ring in either the open or closed position using a shape memory alloy actuator is disclosed. The shape memory alloy actuator may be in the form of a pin or a tube.

Also disclosed is a system, such as a space vehicle, that uses a clamp to connect a first structure to a second structure. The clamp has a shape memory alloy actuator that determines when to change positions of the clamp, from closed to open or vice versa. A temperature of the shape memory alloy actuator may determine when to change positions of the clamp. The temperature of the shape memory alloy actuator may depend on whether the space vehicle is in a direct line of sight of radiation from the sun or whether heat is applied to the actuator. Alternatively, a force applied to the shape memory alloy actuator may determine when to change positions of the clamp.

A method of actuating a clamp with a shape memory alloy actuator is also disclosed. The method includes maintaining the clamp in a first position during a first period of time and then moving the clamp to a second position when the shape memory alloy actuator receives an external trigger. The two clamp positions are opened and closed.

In one example, the external trigger is temperature and the method includes maintaining a clamp in a first position until a temperature of the shape memory alloy actuator passes a martensitic transition temperature, which is when the clamp moves to the second position. The temperature of the shape memory alloy actuator passes the martensitic transition temperature by either rising or falling. In another example, the external trigger is a force and the clamp moves to the second position when the force is applied to the shape memory alloy actuator.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Presently preferred embodiments are described below in conjunction with the appended drawing figures, wherein like reference numerals refer to like elements in the various figures, and wherein.

Figure 1A:
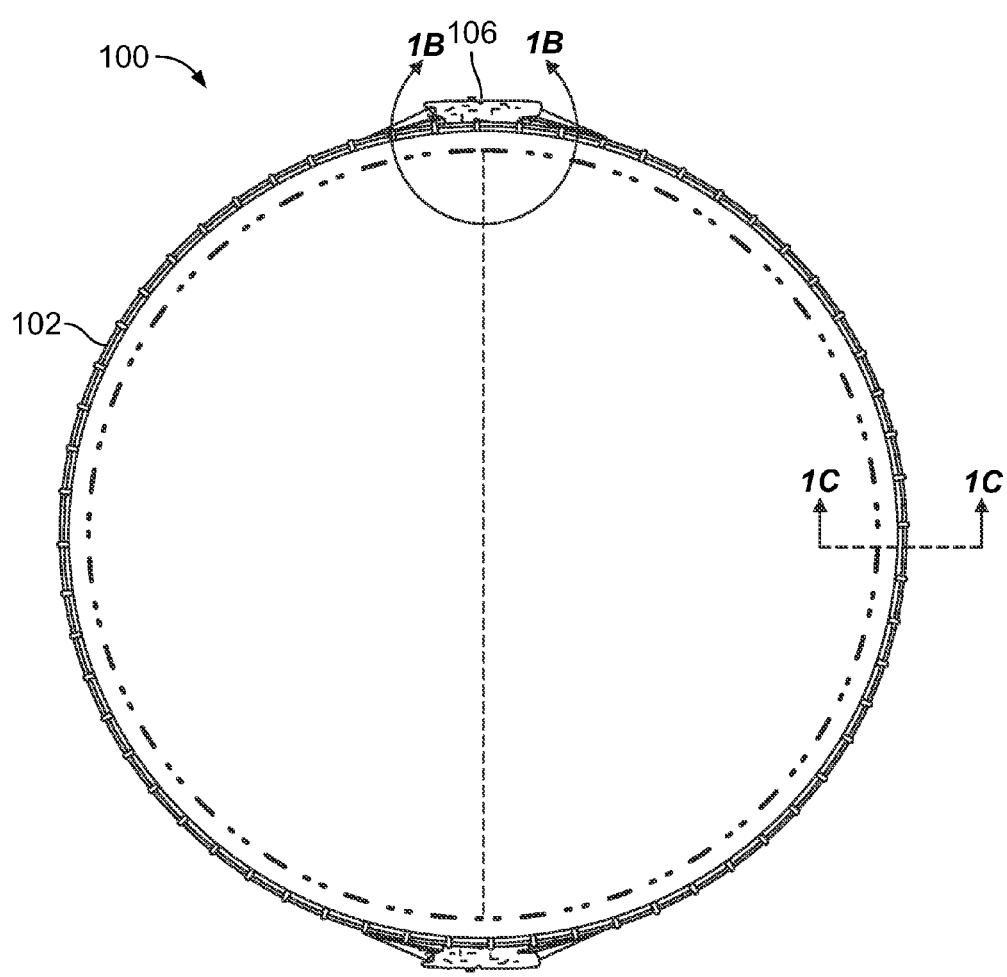
FIGS. 1*a-c* illustrate a typical Marman clamp system as provided in NASA's Marman Clamp System Design Guidelines, Guideline No. GD-ED-2214.
Figure 1B:
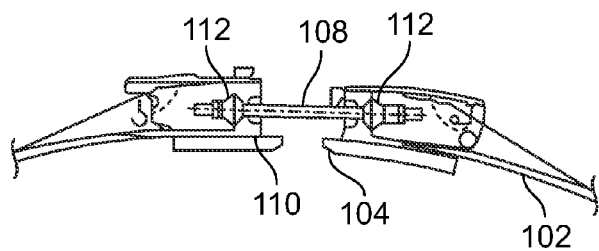
Figure 1C:
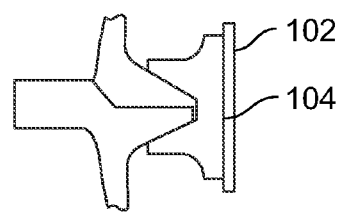

The drawings are for the purpose of illustrating example embodiments, but it is understood that the inventions are not limited to the arrangements and instrumentality shown in the drawings.

DETAILED DESCRIPTION

Figure 2:
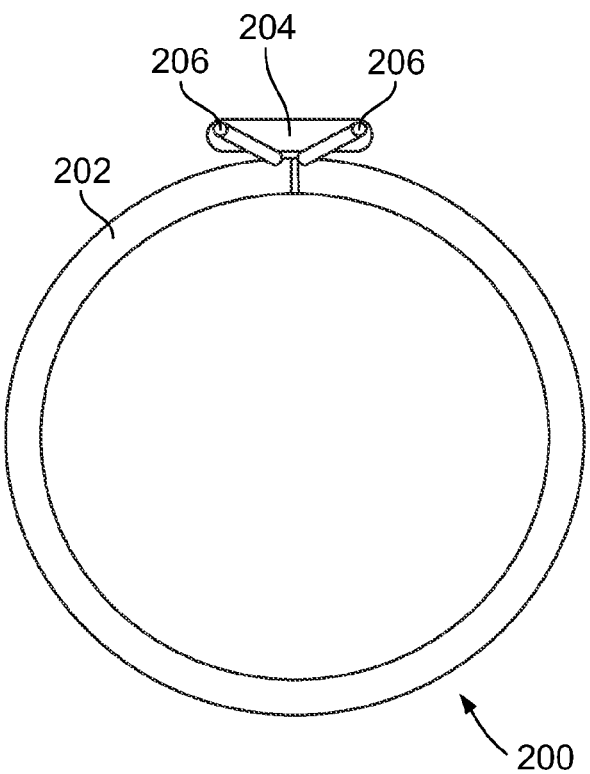
FIG. 2 is an illustration of an SMA active Marman clamp in a closed position, according to an example.
Figure 3:
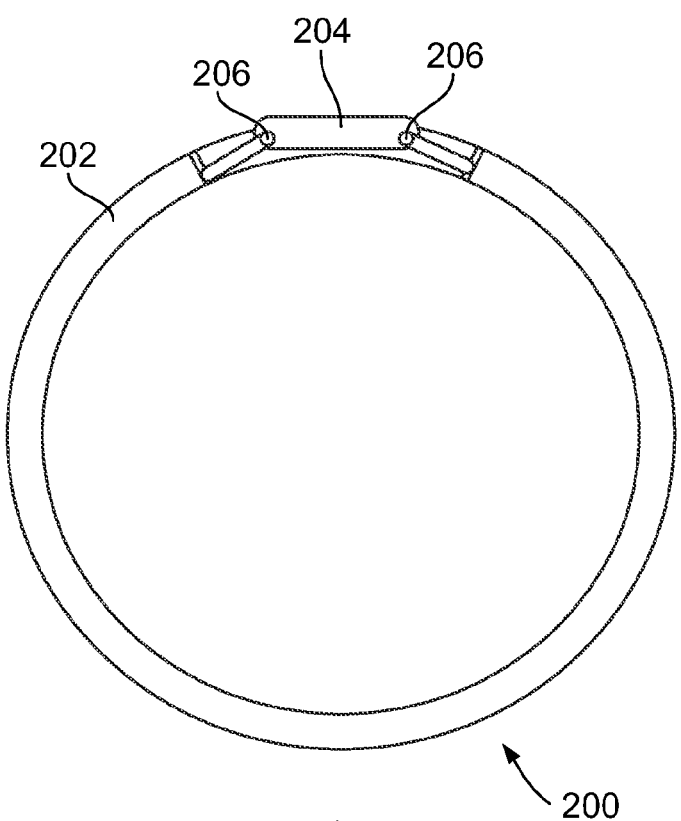
FIG. 3 is an illustration of an SMA active Marman clamp in an open position, according to an example

FIG. 2 is an illustration of a Marman clamp 200. The Marman clamp 200 includes a ring 202 and a release mechanism 204. The ring 202 is sometimes referred to as a band or a strap. As shown in FIG. 2, the release mechanism 204 is in a closed position. FIG. 3 depicts the release mechanism 204 in the open position.

The ring 202 may be formed using any suitable material for space conditions. Preferably, the ring 202 is formed using a highly ductile material that resists stress corrosion cracking. For example, the ring 202 may be formed using aluminum. Other possible ring materials include steel and titanium. The ring 202 includes ends that connect to the release mechanism 204.

Figure 4:
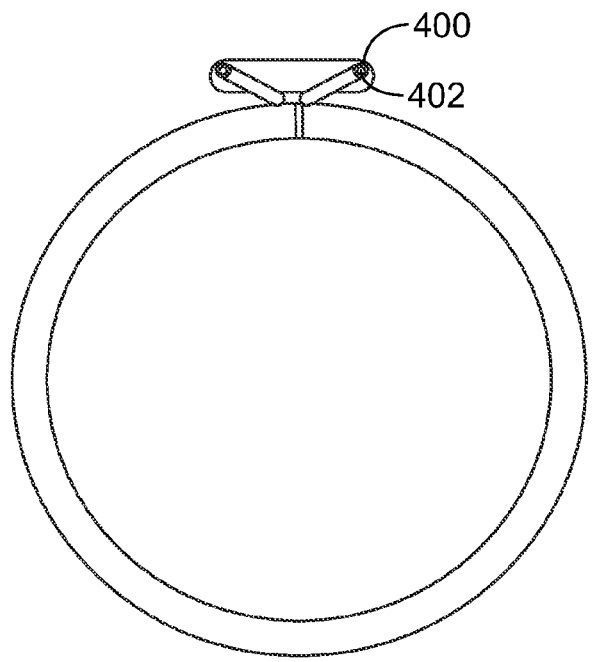
FIG. 4 is an illustration of an SMA active Marman clamp, according to another example.

The release mechanism 204 includes shape memory alloy (SMA) pins 206. Alternatively, the release mechanism 204 may include SMA tubes 400 as shown in FIG. 4. An SMA tube 400 is similar to an SMA pin 206 except that the tube 400 has a hole 402 at its center. The SMA pins 206 and the SMA tubes 400 are referred to as actuators because they control whether the Marman clamp 200 is in an open or closed position. U.S. Patent Application Publication No. 2005/0198777 describes methods for making SMA pins and tubes and is incorporated in its entirety herein. While the remainder of this description refers to the SMA pins 206, it is understood that the pins 206 may be replaced with the SMA tubes 400.

Shape memory alloy is an alloy that changes shape in response to its temperature. A transition temperature defines when the alloy transitions from one shape to another. In particular, the alloy transitions from a martensitic state to an austenitic state when heated above the transition temperature, and then returns to its martensitic state when cooled below the transition temperature. For the Marman clamp 200, the temperature determines whether the clamp 200 is in its closed position as shown in FIG. 2 or its open position as shown in FIG. 3.

An example of an SMA is Nitinol. Nitinol is a nickel titanium (NiTi) alloy. There are various versions of Nitinol depending on the amount of nickel as compared to titanium in the alloy. For example, Nitinol 55 includes 55% nickel by weight. The material properties of Nitinol 55 are well known. Other known versions of Nitinol include Nitinol 57 and Nitinol 60. The amount of nickel in Nitinol impacts the alloy's transition temperature.

The SMA pins 206 may be formed with any type of Nitinol. The SMA pins 206 may also be formed using other shape memory alloys, such as an alloy formed with nickel, titanium, copper, zinc, aluminum, platinum, and palladium. For example, the SMA pins 206 may be formed using an alloy of copper and nickel.

The choice of alloy may be based on the operating temperature ranges, transition temperatures, and transition times. In particular, the type of alloy used for the pins 206 impacts when the Marman clamp 200 opens and closes. For example, if the alloy is Nitinol 55, the clamp 200 may close at a temperature of approximately 130° C. and open at approximately 30° C. depending on actuator training and alloy composition. For example, with actuator training, the Marman clamp 200 may open when heated as opposed to when it is cooled.

The size of the Marman clamp 200 may depend on the diameter of the pins 206. The pin diameter may be as small as 1/10th of an inch and can be much larger depending on the temperature properties of the pin 206. The pin diameter should be large enough not to be affected by surrounding materials and be able to hold heat.

Figure 5:
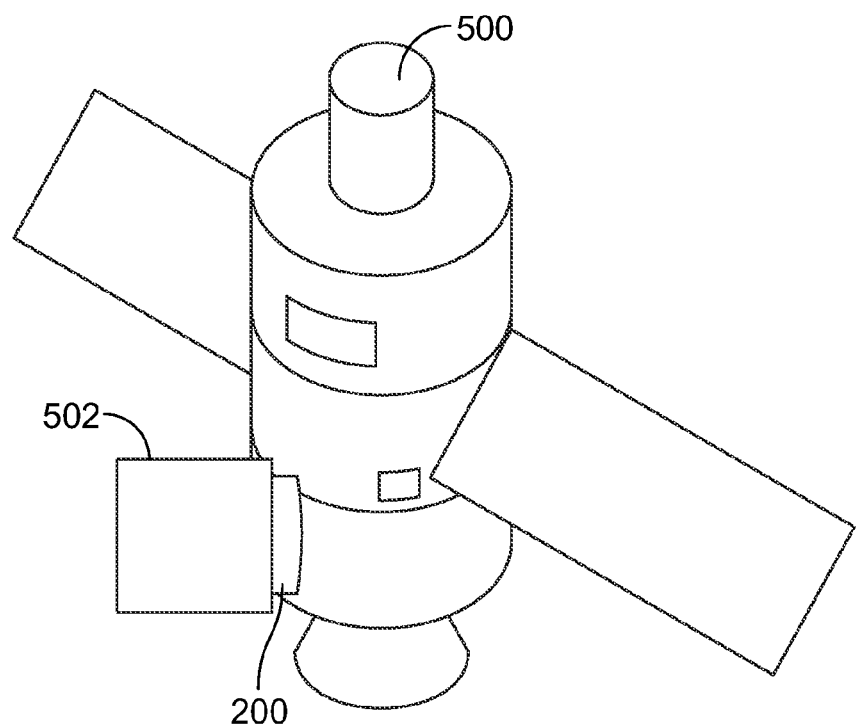
FIG. 5 is an illustration of a space vehicle using a Marman clamp, according to an example.

FIG. 5 is an illustration of a space vehicle 500 using a Marman clamp 200 to connect a payload 502 to the space vehicle 500. In this example, the space vehicle 500 is a satellite and the payload 502 is an auxiliary satellite payload. It is understood that there are other space applications for the Marman clamp 200. For example, the Marman clamp 200 may be used to connect satellite payloads to rockets, join rocket stages, to connect antennas to the space vehicle 500, and for other clamping applications.

In space, there is no atmosphere and, thus, no heat transfer. In one example, when the space vehicle 500 is in direct line of sight of radiation from the sun, the Marman clamp 200 remains in its closed position. As a result, the payload 502 remains connected to the space vehicle 500 until the space vehicle 500 is located away from the sun.

In this example, when the space vehicle 500 is out of the direct line of sight of radiation from the sun, the surrounding temperature drops below the transition temperature of the alloy used in the pins 206. At that point, the Marman clamp 200 opens releasing the payload 502 into orbit. As the release mechanism 204 depends only on the surrounding temperature and the transition temperature of the alloy, the Marman clamp 200 is not damaged during release like pyrotechnic-based clamps. Instead, the Marman clamp 200 closes again once the surrounding temperature increases above the transition temperature.

In another example, the Marman clamp 200 may include pins 206 that have been trained to open in the direct line of sight of radiation from the sun. The pins 206 may be trained using a tooling fixture during heat treatment. The space vehicle mission determines whether the Marman clamp 200 is designed to be in the open position when it is in or out of the direct line of radiation from the sun.

While the previous examples described the use of heat from the sun, it is also possible to use another heat source to trigger the Marman clamp 200 to open or close. For example, the heat source may be a heater or an electrical current. In this example, the performance of the Marman clamp 200 is not dependent on the direction that the space vehicle 500 or the clamp 200 is facing. Rather, the temperature and, therefore, the actuator performance are controlled as needed.

In addition to heat, another external trigger may be used to open and close the Marman clamp 200. For example, an independent force may be applied to the release mechanism 204, such as an electromagnetic or applied force. With either the heat source or independent force applied to the release mechanism 204, the Marman clamp 200 may be used in non-space applications (e.g., land applications) as well as space applications.

While FIG. 2 depicts a release mechanism 204 with two SMA pins 206, the release mechanism 204 may also include a single SMA pin 206. In this example, the second pin may be fabricated using an elastic or other flexible material. Alternatively, the second pin may be replaced with a spring.

In addition to not being damaged during release, the release mechanism 204 eliminates the need for redundant release mechanisms on the Marman clamp 200. As a result, the Marman clamp 200 is lighter and less complex than the pyrotechnic-based clamps. Additionally, the Marman clamp 200 is easier to install as it functions as its own tightening device.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A Marman clamp system, comprising:
a ring having a first end and a second end; and
a release mechanism coupled to the first end of the ring and the second end of the ring, wherein the release mechanism includes a first shape memory alloy actuator and a second shape memory alloy actuator, wherein the first shape memory alloy actuator and the second shape memory alloy actuator move the ring from an open position to a closed position when both the first shape memory alloy actuator and the second shape memory alloy actuator receive an external trigger.

2. The Marman clamp system of claim 1, wherein the first shape memory alloy actuator and the second shape memory alloy actuator are a pin.

3. The Marman clamp system of claim 1, wherein the first shape memory alloy actuator and the second shape memory alloy actuator are a tube.

4. The Marman clamp system of claim 1, wherein the first shape memory alloy actuator and the second shape memory alloy actuator are Nitinol.

5. The Marman clamp system of claim 4, wherein the Nitinol is approximately 55% nickel by weight.

6. The Marman clamp system of claim 4, wherein the Nitinol is greater than 55% nickel by weight.

7. The Marman clamp system of claim 1, wherein the first shape memory alloy actuator and the second shape memory alloy actuator are an alloy formed with copper and nickel.

8. The Marman clamp system of claim 1, wherein the first shape memory alloy actuator and the second shape memory alloy actuator are an alloy formed with platinum.

9. The Marman clamp system of claim 1, wherein t first shape memory alloy actuator and the second shape memory alloy actuator are an alloy formed with palladium.

10. The Marman clamp system of claim 1, wherein the external trigger is temperature and the ring moves to the closed position when the temperature of both the first shape memory alloy actuator and the second shape memory alloy actuator passes a martensitic transition temperature.

11. The Marman clamp system of claim 1, wherein the external trigger is a force and the ring moves to the closed position when the force is applied to both the first shape memory alloy actuator and the second shape memory alloy actuator.

* * * * *